US006671495B1

(12) United States Patent
Lappeteläinen et al.

(10) Patent No.: US 6,671,495 B1
(45) Date of Patent: Dec. 30, 2003

(54) METHOD FOR TRANSMITTING MEASUREMENT DATA IN A WIRELESS COMMUNICATION SYSTEM AND A WIRELESS COMMUNICATION SYSTEM

(75) Inventors: Antti Lappeteläinen, Espoo (FI); Visa Smolander, Espoo (FI); Juha Salokannel, Kangasala (FI)

(73) Assignee: Nokia Corporation, Espoo (FI)

( * ) Notice: Subject to any disclaimer, the term of this patent is extended or adjusted under 35 U.S.C. 154(b) by 421 days.

(21) Appl. No.: 09/714,587

(22) Filed: Nov. 16, 2000

(30) Foreign Application Priority Data

Nov. 18, 1999 (FI) .............................. 19992473

(51) Int. Cl.[7] .............................................. H04B 17/00
(52) U.S. Cl. ...................... 455/67.1; 455/562; 370/245
(58) Field of Search ............................ 455/67.1, 67.3, 455/67.4, 25, 562, 41, 277.1, 277.2, 424, 425; 370/241, 245, 246

(56) References Cited

U.S. PATENT DOCUMENTS 5,828,661 A     10/1998   Weaver, Jr. et al. ........ 370/331
6,370,369 B1 *   4/2002   Kraiem et al. ........... 455/277.1

FOREIGN PATENT DOCUMENTS

WO     WO 99/21310     4/1999

OTHER PUBLICATIONS

"A Four–Sector Shaped–Beam Antenna for 60–GHz Wireless LANs", Murakami et al., IEICE TRANS. ELECTRON., vol. E82–C, 1999, pp. 1293–1300.
"Packet Data Throughput for Wireless Systems with Smart Antennas", Stridh et al., IEEE Xplore, Vehicular Technology Conference, 1999, vol. 1, pp. 32–36.

* cited by examiner

Primary Examiner—Lee Nguyen
(74) Attorney, Agent, or Firm—Perman & Green, LLP (57) ABSTRACT

The invention relates to a method in a wireless communication system (1) which includes wireless terminals (MT1–MT4) and at least one access point (AP1, AP2) and access point controller (APC1, APC2). At least one antenna configuration is determined for an antenna (30) of the wireless terminal (MT1–MT4). In the method, the antenna (30) of the wireless terminal (MT1–MT4) is used for receiving a radio signal and the strength of the radio signal received by the antenna (30) of the wireless terminal (MT1–MT4) is measured. A measurement message (HD1, D1) is formed of one or more measurements, which is transmitted from the wireless terminal (MT1–MT4) to the access point (AP1, AP2). Further in the method, data (UAC) about the antenna configuration during the measurement is added into the measurement message (HD1, D1).

22 Claims, 9 Drawing Sheets

METHOD FOR TRANSMITTING MEASUREMENT DATA IN A WIRELESS COMMUNICATION SYSTEM AND A WIRELESS COMMUNICATION SYSTEM

BACKGROUND OF THE INVENTION

1. Field of the Invention

The present invention relates to a method in a wireless communication system according to the preamble of the appended claim 1. The invention also relates to a wireless communication system according to the preamble of the appended claim 11. The invention also relates to a wireless terminal according to the preamble of the appended claim 21 and to an access point according to the preamble of the appended claim 22.

2. Brief Description of Related Developments

Communication systems intended for an office environment, so-called local area networks (LAN), are primarily implemented as wired systems. Thus, the connection between the terminals and the server is implemented either electrically by means of a cable or optically by means of an optical fibre. An advantage of such a fixed system is, for example, the possibility to achieve relatively high data transmission rates. A disadvantage of such a fixed communication system is that it is difficult to make changes, and the terminals must usually be placed relatively close to connection points intended for them, which affects the movability of the terminal. The implementation of such a wired local area network in an already existing building is not always possible, or it is expensive to install the cables afterwards. On the other hand, particularly in older buildings, there possibly already exists a communication cabling which is not necessarily suitable for fast data transmission.

There are various wireless communication systems under development for implementing local area networks. Several wireless communication systems are based on the use of radio signals in data transmission. One such communication system for a local area network under development, based on radio communication, is the so-called HIPERLAN (High PErformance Radio Local Area Network). Such a radio network is also called a broadband radio access network (BRAN).

In version 2 of the HIPERLAN communication system under development, the aim is to achieve a data transmission rate of even more than 30 Mbit/s, the maximum connection distance being some tens of metres. Such a system is suitable for use in the same building e.g. as an internal local area network for one office. There is also a so-called HIPERACCESS communication system under development, in which the aim is to achieve the same data transmission rate as in said HIPERLAN/2 communication system, but the aim is to achieve a connection distance of several hundreds of metres, wherein the HIPERACCESS system is suitable for use as a regional local area network for example in schools and larger building complexes.

Figure 1A:
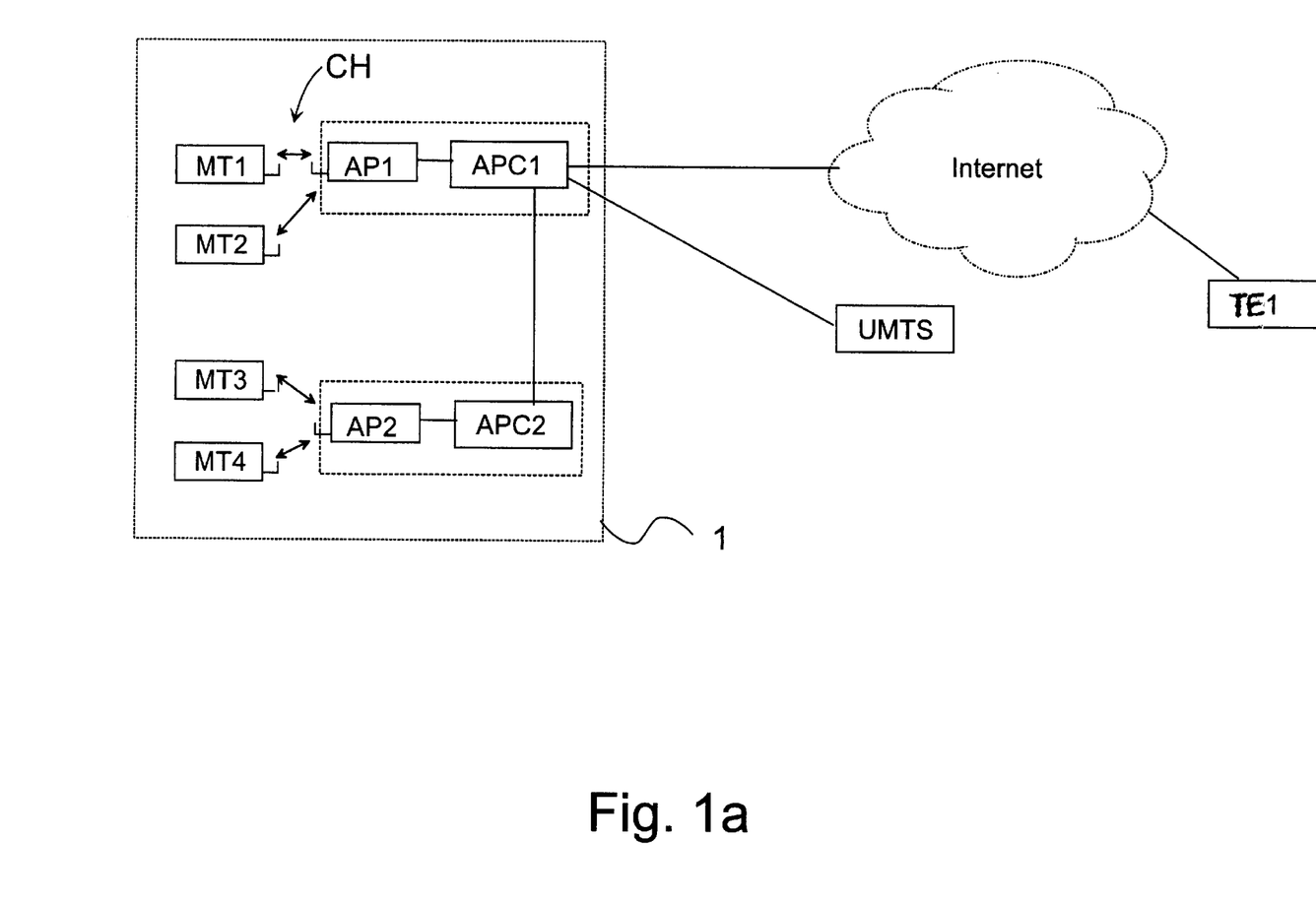
FIG. 1a shows a communication according to an advantageous embodiment of the invention in a reduced block chart.
Figure 1B:
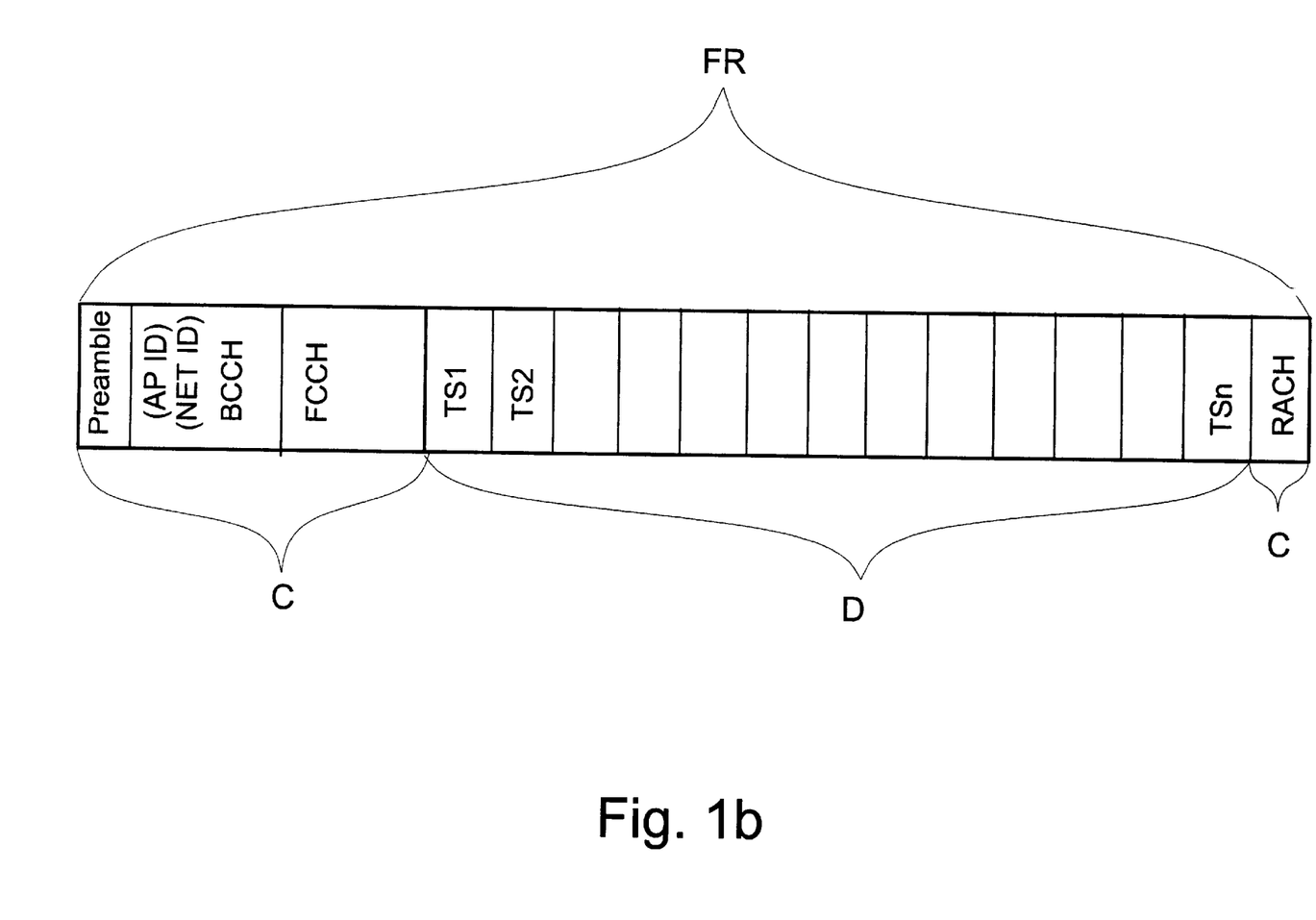
FIG. 1b shows a data frame in the HIPERLAN/2 system.

In the data link layer DLC of the HIPERLAN/2 system used as an example, the MAC (Medium Access Control) frame structure is illustrated in a reduced manner in the appended FIG. 1b. The data frame FR consists of control fields C, such as RACH (Random Access Channel), BCCH (Broadcast Control Channel), and FCCH (Frame Control Channel), as well as of a data field D which comprises a certain number of time slots TS1, TS2, . . . , Tsn, in which it is possible to transmit actual payload information.

Each control field C as well as the packets to be transmitted in the time slots of the data field preferably contain error check data which is calculated by the access point AP1 transmitting the data frame and added into the control fields C of the data frame and the packets to be transmitted in the time slots TS1, TS2, . . . , TSn. This check data is preferably a checksum calculated on the basis of information contained in said field, such as CRC (Cyclic Redundancy Check). In the receiving wireless terminal MT1, it is possible to use the error check data to examine whether there were possible errors in the data transmission. The field C, D may also contain several items of such check data calculated from part of the information contained in the field. For example in the HIPERLAN/2 system, the FCCH control field consists of smaller information elements, check data being calculated for each of them. The number of these information elements can vary in each data frame. All data frames do not necessarily have an FCCH control field, wherein also the number of information elements is zero.

Data transmission in the HIPERLAN/2 system is based on time division multiple access TDMA, wherein there can be several simultaneous connections on the same channel, but each connection is allocated a separate time slot in said frame, wherein data is transmitted. Because the quantity of data to be transmitted is normally not constant in all the simultaneous connections, but it varies with time, a so-called adapting TDMA method is used, wherein the number of time slots to be allocated for each data transmission connection may vary from zero to a maximum, depending on the loading situation each time as well as on the data transmission capacity allocated for the connection.

For time division multiple access to work, the terminals coupled to the same node must be synchronized with each other and with the transmission of the node. This can be achieved for example in such a way that the receiver of the wireless terminal receives signals on a channel. If a signal is not detected on the channel, the receiver changes over to receive on another channel, until all the channels have been examined or a channel is found on which a signal transmitted by an access point is detected. By receiving and demodulating this signal, it is possible to determine the moment of transmission of the control channel BCCH of the access point in question and to synchronize the terminal on the basis thereof. In some cases, the terminal can detect the signal of more than one access point, wherein the terminal advantageously selects the access point which has the strongest signal in the receiver, and performs the synchronization with this access point.

When the terminal is synchronized with the access point, the terminal can initiate a connection set-up to couple to this access point. This can be conducted advantageously in such a way that the terminal transmits on the RACH control channel a connection set-up request to the access point. In practice, this means that the terminal transmits in the time slot allocated to the RACH control channel and at the same time the access point listens to the communication on the channel i.e. receives signals on the channel frequency it is using. When the access point detects that a terminal is transmitting a connection set-up request message, it performs the procedures necessary for the connection set-up, such as resource allocation for the connection, if it is possible. In the resource allocation, the quality of service requested for the connection is taken into account, which affects e.g. the number of time slots to be allocated for the connection. The access point informs the terminal whether the connection set-up is possible or not. If the connection set-up is successful, the access point transmits in the BCCH control field e.g. data on the transmission time slots, reception time slots, connection identifier, etc. which are allocated for the connection. The number of transmission and reception time slots is not necessarily the same, because in several cases the quantity of information to be transmitted is not the same in both directions. For example when using an Internet browser, the quantity of information transmitted from the terminal is considerably smaller than the amount of information received in the terminal. Thus, with respect to the terminal, the required number of transmission time slots is smaller than that of reception time slots. Furthermore, the number of time slots allocated for the connection can advantageously vary in different frames according to the need to transmit data. The access point controller is provided with a so-called scheduler, one function of which is the aforementioned allocation of time slots for different connections. The scheduler is implemented advantageously as an application program in the access point controller.

Since duplex data transmission is necessary in local area networks, duplex data transmission is also necessary on the radio channel. In a time division system this can be implemented either in such a way that some of the time slots of the frame are allocated for transmission from the wireless terminal to the access point (uplink) and some of them are allocated for the transmission from the access point to the wireless terminal (downlink), or in such a way that a separate frequency band is allocated for each data transmission direction. The HIPERLAN/2 system suggests the use of the former of the aforementioned methods, wherein the access point and the wireless terminals coupled to it do not transmit simultaneously.

In the HIPERLAN/2 systems, the access points can select the channel to be used in the connection irrespective of the other access points. Furthermore, the scheduler of the access point selects the moment of time to be used for the transmission irrespective of the other access points. In practice, this means that two or more access points can make an attempt to transmit simultaneously on the same channel, wherein the transmission is unsuccessful. In order to prevent this collision of transmissions, the transmitting access point or wireless terminal first listens to the signals of one or more frequencies. The access point selects a frequency with as little interference as possible, and if the interference level later rises at the selected frequency, the access point may e.g. change over to use another frequency.

As already presented above in this description, the radio local area network can comprise several access points, and the width of their coverage area is affected by e.g. the transmission level, ambient conditions, possible obstacles on the path of the signal, the directional pattern of the antenna, etc. In practice, it is not possible to determine the limits of the coverage area of access points clearly, but the coverage areas of access points located close to each other overlap at least partly. Thus, a wireless terminal may, in some cases, be in the coverage area of two or more access points, but these access points do not necessarily detect the transmissions of each other. Of these access points, the wireless terminal selects one for use in a data transmission connection. On the other hand, the access point to be used in the connection may be changed when the wireless terminal is moving or when the quality of the connection varies, which is known as such. Because the access points can select the channel to be used in the connection irrespective of other access points and time the transmissions independently, the properties of the data transmission between the wireless terminal and the access point to be used in the connection each time may be affected by another or several other access points, in whose coverage area the wireless terminal is located. Such interference may also occur in situations, in which the frequencies to be used are not the same, but two access points transmit e.g. on adjacent channels.

Access points which interfere with communication may also be access points of another radio network or other radio stations, radar stations, etc. This is possible particularly when there are several such radio systems within the same geographical area, which use at least partly overlapping frequency ranges or frequency ranges close to each other.

The properties of the data transmission are affected by not only interference by other radio devices but also changes in ambient conditions. These changes may be caused by e.g. multipath propagation of the signal, the moving of the wireless terminal within the operating range of the communication network, from the area of one cell to the area of another cell, or outside the operating range of the communication network, wherein the propagation conditions of the signal may vary. Also changes in air temperature and humidity may affect signal propagation and cause changes in the data transmission connection.

Upon setting up a data transmission connection, the wireless terminal listens, which access points transmit signals that can be received. The wireless terminal preferably also measures the signal strengths and selects e.g. the access point whose signal is the strongest at the moment. After this, the wireless terminal and the access point conduct connection set-up signalling, to transmit for example the parameters to be used in the connection, such as the required data transmission rate, the connection type, the communication channel, the time slots, as well as the connection identifier.

The wireless terminal typically also measures the strength of the signal of the access point to be used in the connection, as well as the strengths of the signals of possible other access points in the coverage area. If another access point is detected to have a sufficiently greater signal strength than the signal strength of the access point used at the moment, it is possible to hand the connection over to this second access point, which is known as such.

The access point can also request the wireless terminal to measure signal strengths. These measuring results are transmitted to the access point, which may, on the basis of the measuring results, analyze the interference level, find out about the cause of the interference e.g. whether the measured signal is a signal of a wireless terminal or access point belonging to the same radio local area network, a signal of an access point belonging to another radio local area network, or a signal caused by another system. As a result of the analysis of the measurements, the access point may e.g. perform a channel change, if it is expected that the quality of the connection is improved at the new channel frequency. The access point tries to identify the cause of the interference. If the access point detects that the interfering signal is a signal of a device belonging to a similar communication system but a different radio local area network (e.g. the local area network of another operator), the access point may try to reduce the effect of the interference e.g. by increasing the transmission level, by changing the channel coding, and/or by using modulation which is more resistant to interference. If the source of interference does not belong to the same system, the access point may try to reduce the interference preferably by changing the channel frequency. In HIPERLAN/2 systems and in other radio communication systems, in which the use of channel frequencies has not been taken into account at the planning stage, the access point should select the channel frequencies so that the available channel frequencies were used as evenly as possible and that the devices belonging to the same system would not disturb each other.

Recently, so-called intelligent antennas have been developed. They can be used e.g. as transmitting/receiving antennas of access points. Also for wireless terminals, such antenna solutions based on the intelligent antenna are under development. A significant property of the intelligent antenna is the adaptive tuning of the directional pattern of the antenna. Thus, it is possible in the access point to monitor moving terminals and try to direct the directional pattern of the antenna towards the terminal. In a corresponding manner, the wireless terminal may try to find out in which direction the access point is located and to direct the directional pattern of the antenna towards this direction. By means of this arrangement, the reception of the signal can be improved, wherein the range can be increased and/or the transmission level at the access point/terminal can be reduced. Furthermore, interference caused by radio signals with other radio devices and terminals/access points of the same radio local area network may decrease.

The use of the intelligent antenna may, however, cause errors in interpreting measurement results in prior art radio local area networks and other communication systems based on radio communication, in which radio interference is measured. This is due to the fact that in systems of prior art, it is not possible to take into account the effect of the intelligent antenna in the analysis of the measurement results, but the analysis is normally made presuming that the antenna is ommidirectional. Thus, the above-mentioned measurement results do not necessarily give a true reflection on the interference situation, because in the case of an omnidirectional antenna, the aim is to make the directional pattern substantially identical in all directions. As a result of the analysis, the access point may unnecessarily e.g. raise the transmission level or change the channel frequency, if the antenna used in the measurements does not comply with the assumption. This, in turn, may result in an increase, instead of decrease, of the interference level.

SUMMARY OF THE INVENTION

It is an aim of the present invention to provide a system, in which more reliable analyses of measurement results are obtained as compared with systems of prior art, wherein also the interference level can be reduced. One embodiment of a method, in a wireless communication system (1) which comprises wireless terminals (MT1–MT4) and at least one access point (AP1, AP2) and access point controller (APC1, APC2), includes the following: at least one antenna configuration is determined for an antenna (30) of the wireless terminal (MT1–MT4), the antenna (30) of the wireless terminal (MT1–MT4) is used for receiving a radio signal, the strength of the radio signal received by the antenna (30) of the wireless terminal (MT1–MT4) is measured, a measurement message (HD1, D1) is formed of one or more measurements, and said measurement message (HD1, D1) is transmitted from the wireless terminal (MT1–MT4) to the access point (AP1, AP2), characterized in that in the method, data (UAC) about the antenna configuration during the measurement is also added into said measurement message (HD1, D1).

In one aspect, the present invention is directed to a wireless communication system. In one embodiment, the wireless communication system comprises a wireless communication system (1) which comprises wireless terminals (MT1–MT4) comprising at least one antenna (3) for receiving radio signals, at least one antenna configuration being determined for the antenna (30), at least one access point (AP1, AP2) and access point controller (APC1, APC2), means (29) for measuring the strength of a radio signal received with the antenna (30) of the wireless terminal (MT1–MT4), means (11) for forming a measurement message (HD1, D1) of one or more measurements, and means (COM) for transmitting said measurement message (HD1, D1) from the wireless terminal (MT1–MT4) to the access point (AP1, AP2), characterized in that the wireless communication system (1) also comprises means (11) for adding data (UAC) indicating at least one antenna configuration used during the measurement into said measurement message (HD1, D1).

The wireless terminal according to another embodiment of the present invention comprises a wireless terminal (MT1–MT4) comprising at least one antenna (30) for receiving radio signals, at least one antenna configuration being determined for the antenna (30), means (29) for measuring the strength of a radio signal received with the antenna (30) of the wireless terminal (MT1–MT4), means (11) for forming a measurement message (HD1, D1) of one or several measurements, and means (COM) for transmitting said measurement message (HD1, D1), characterized in that the wireless terminal (MT1–MT4) also comprises means (11) for adding data (UAC) indicating at least one antenna configuration used during a measurement into said measurement message (HD1, D1).

In another aspect, the present invention is directed to an access point. In one embodiment, the access point comprises means (COM) for receiving a measurement message (HD1, D1) formed in the wireless terminal (MT1–MT4), characterized in that the access point (AP1, AP2) determines, from said measurement message, data (UAC) indicating at least one antenna configuration used during a measurement (HD1, D1).

The invention is based on the idea that in connection with the measurement results, it is possible to give the antenna type, wherein the effect of the antenna on the measurement results, i.e. deviations of the directional pattern from the default value, can be taken into account in the analysis of the measuring results. In the HIPERLAN/2 system, the access point is the unit in which the analysis is made.

The present invention gives significant advantages to methods and wireless communication systems of prior art. Using the method of the invention, the analysis of the measurement results can be made more reliable than is possible to achieve in systems of prior art. The invention can also be used to reduce the need for handover. In the communication system according to the invention, it is still possible to reduce the interference, because the access points do not increase their transmission level unnecessarily, wherein the utilization rate of the communication system is improved significantly.

BRIEF DESCRIPTION OF THE DRAWINGS

In the following, the invention will be described in more detail with reference to the appended drawings, in which.

DETAILED DESCRIPTION OF THE PREFERRED EMBODIMENT(S)

In the following description of a communication system 1 according to an advantageous embodiment of the invention, the HIPERLAN/2 system of FIG. 1a is used as an example, but it is obvious that the invention is not restricted solely to this system. The communication system 1 consists of wireless terminals MT1–MT4, one or more access points AP1, AP2, as well as access point controllers APC1, APC2. A radio connection is set up between the access point AP1, AP2 and the wireless terminal MT1–MT4, for transmitting e.g. signals necessary for setting up the connection and information during the connection, such as data packets of an Internet application. The access point controller APC1, APC2 controls the operation of the access point AP1, AP2 and the connections set up via them to the wireless terminals MT1–MT4. The access point controller APC1, APC2 has a controller 19 in whose application software some functions of the access point are implemented, such as the access point scheduler which performs various scheduling operations in a way known as such. In such a radio network, several access point controllers APC1, APC2 may communicate with each other as well as with other data networks, such as the Internet network, the UMTS mobile communication network (Universal Mobile Terminal System), etc., wherein the wireless terminal MT1–MT2 may communicate e.g. with a terminal TE1 coupled to the Internet network.

Figure 2:
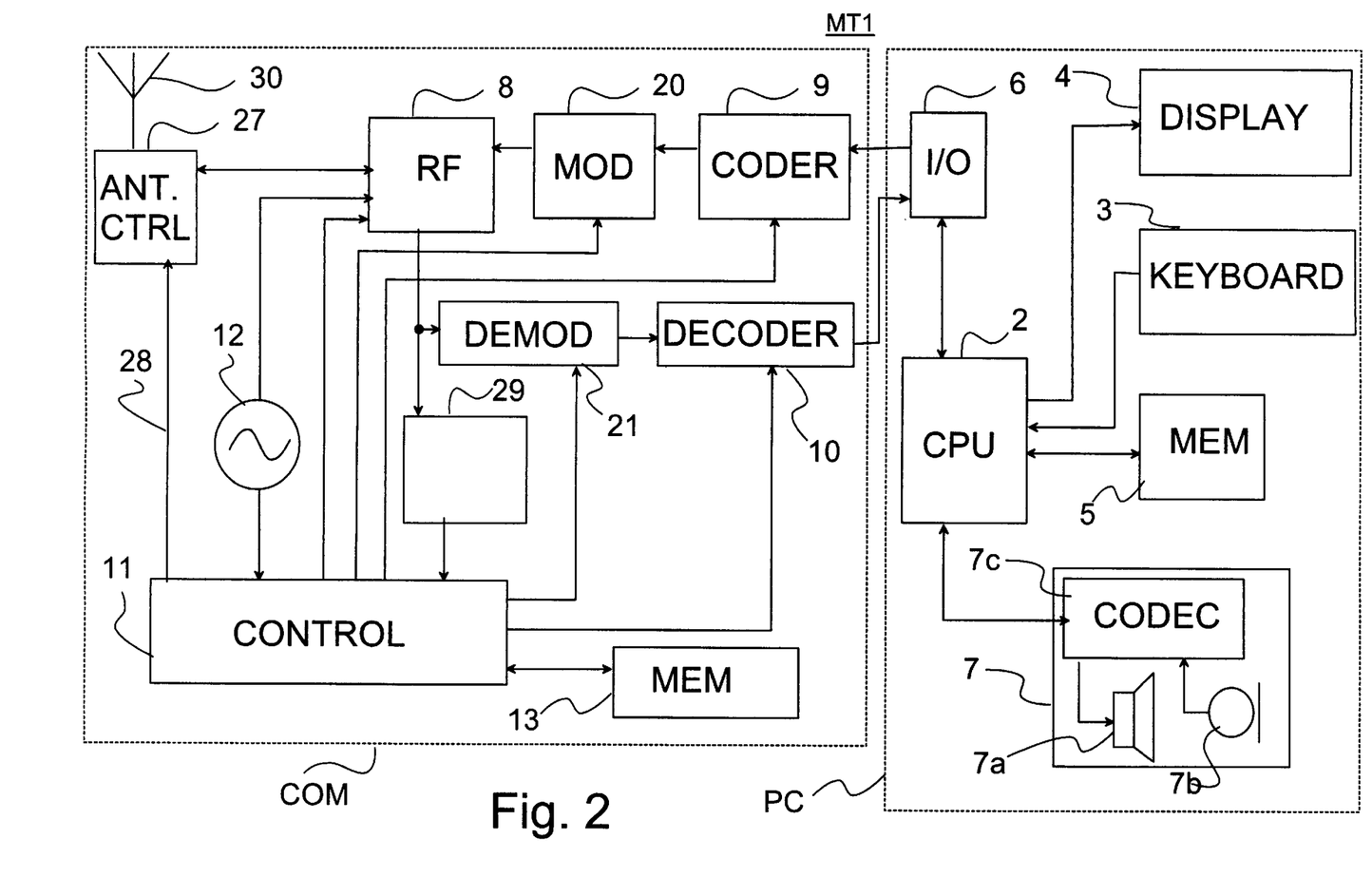
FIG. 2 shows a wireless terminal according to an advantageous embodiment of the invention in a reduced block chart.

FIG. 2 shows, in a reduced block chart, a wireless terminal MT1 according to an advantageous embodiment of the invention. The wireless terminal MT1 preferably comprises data processing functions PC as well as communication means COM for setting up a data transmission connection to a wireless local area network. The wireless terminal may also be formed in such a way that a data processor, such as a portable computer, is equipped with e.g. an expansion card which comprises said communication means COM. The data processing functions PC preferably comprise a processor 2, such as a microprocessor, a microcontroller or the like, a keyboard 3, a display means 4, memory means 5, and connection means 6. Furthermore, the data processing functions PC may comprise audio means 7, such as a speaker 7a, a microphone 7b, and a codec 7c, wherein the user can use the wireless terminal MT1 also for the transmission of e.g. speech. Information intended to be transmitted from the wireless terminal MT1 to the local area network is preferably transferred via the connection means 6 to the communication means COM. In a corresponding manner, information received from the local area network 1 in the wireless terminal MT is transferred into the data processing functions PC via said connection means 6.

The communication means COM comprise e.g. an antenna 30, an antenna control means 27, a high-frequency part 8, a coder 9, a decoder 10, a modulator 20, a demodulator 21, a control means 11, and a reference oscillator 12. In this preferred embodiment, the antenna control means 27 is connected with a control bus 28, by means of which the control means 11 can change the properties of the antenna, if necessary. Furthermore, the communication means COM comprise a memory 13 e.g. for forming transmission and reception buffers necessary for the communication. The coder 9 is used for encoding the information contained in data frames, wherein the encoded information is modulated in the modulator 20. The modulated signal is transferred to the high-frequency part 8, from which a radio-frequency signal is transmitted to a communication channel CH (FIG. 1). In a corresponding manner, the decoder is used for returning the encoded information, received from the communication channel and demodulated in the demodulator, preferably into a data frame format. The reference oscillator 12 is used for producing the necessary scheduling to synchronize the transmission and reception with the transmission and reception of the access point. The reference oscillator 12 can also be used for generating the timing signals of the control means 11. It is obvious that the frequency formed by the reference oscillator 12 cannot be used as such to set the channel frequency and to generate the timing signals of the control means 11, wherein in practical applications, frequency conversion means (not shown) are used to convert the frequency of the reference oscillator 12 into frequencies needed in the radio part and into a frequency suitable for controlling the operation of the control means 11.

In a corresponding manner, the access point AP1 (FIG. 3) comprises first communication means 15, 23–26 for setting up a data transmission connection to wireless terminals MT1–MT4. The local area network 1 according to the invention can also be implemented as an in-house local area network, from which there is no connection to external data networks. In this case, it may suffice to have one access point AP1, to which the wireless terminals MT1–MT4 of the local area network are connected. In the wireless local area network, a data transmission connection 16 is preferably arranged from one or several access points AP1, AP2 to a data processor S which is generally called a server computer or, more briefly, a server. Such a server comprises, in a way known as such, firm data files, application software, etc., in a centralized manner. The users can thus start up applications installed on the server S via the wireless terminal MT1. The server S or the access point AP1 can also comprise second communication means 17 for setting up a data transmission connection to another network, such as the Internet network or the UMTS mobile communication network.

Figure 3:
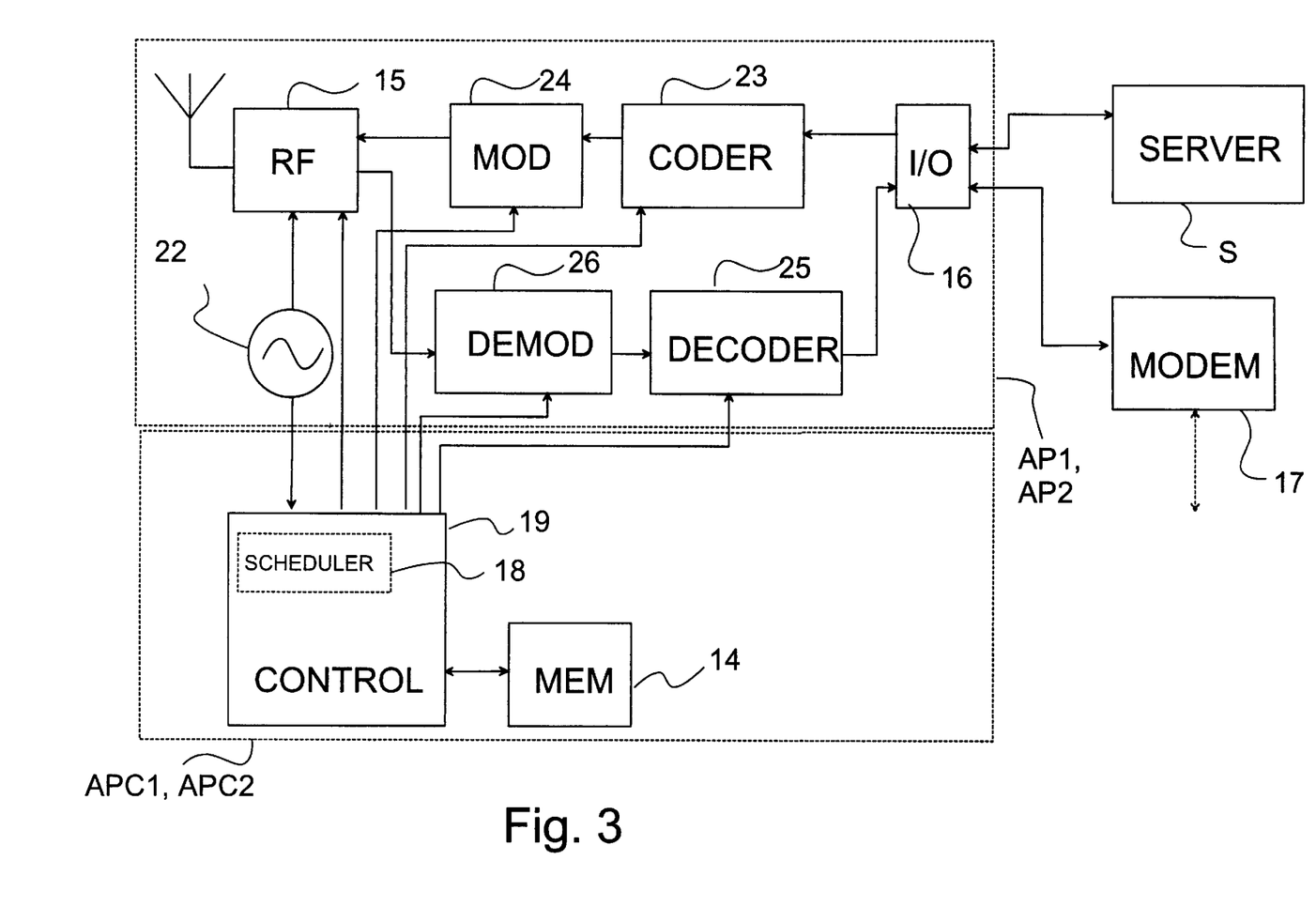
FIG. 3 shows an access point and an access point controller according to an advantageous embodiment of the invention in a reduced block chart.

The communication means of the access point AP1, AP2 comprise one or several oscillators 22 for forming the frequencies needed in the operation, a coder 23, a modulator 24, a decoder 25, and a demodulator 26, as well as a high-frequency part 15, which is known as such.

Each access point AP1, AP2 and wireless terminal MT1–MT4 is allocated an identifier, wherein the access point AP1, AP2 is aware of which wireless terminals MT1–MT4 are connected to the access point AP1, AP2 at the time. In a corresponding manner, on the basis of the identifiers, the wireless terminals MT1–MT4 differentiate the frames transmitted by different access points AP1, AP2 from each other. These identifiers can also be used in such a situation, in which the connection of the wireless terminal MT1–MT4 is handed over from one access point AP1 to another access point AP2, for example as a result of attenuated quality of the connection.

For the communication, the wireless terminal MT1 must be coupled in a data transmission connection to the local area network 1. This can be done preferably by starting in the wireless terminal MT1 a network controller or a corresponding application program which is equipped with program provided with the program codes for coupling to the local area network 1 as well as for transferring data between the wireless terminal MT1 and the local area network 1. In connection with starting up the network controller, the necessary measures are taken e.g. to set the operation parameters of the communication means COM of the wireless terminal. Thus, the receiver of the communication means COM starts to receive signals at a channel frequency of the local area network. It no signal is detected within a certain time, the channel to be listened to is changed. At the stage when a signal is detected on any channel frequency listened to, the signal received by the receiver of the communication means COM is demodulated and transferred to be decoded, wherein the information transmitted in the radio signal can be found out, which is known as such. From this decoded signal, which is preferably stored in the receiving buffer in the memory 13 of the communication means, the identifier of the BCCH control field of the data frame is searched. This BCCH control field identifier is at a certain location of the data frame, wherein after the identifier is found, the location of the BCCH control field is known at the receiving buffer. The BCCH control field contains e.g. the identifier (AP ID) of the access point that transmitted the data frame, the local area network identifier (NET ID), the number of the data frame, as well as information about the length of the FCCH control field, the modulation method and the encoding.

The wireless terminal MT1 is synchronized with the transmission of this access point AP1. The wireless terminal MT1 requests for connection set-up by transmitting an RACH message to the access point AP1 at a moment of time allocated for this. For example in the frame structure of FIG. 1b, the RACH message can be transmitted after the transmission and reception time slots, before the next BCCH control field. In the message, the wireless terminal MT1 transmits data on e.g. the quality of service level requested for the connection, and about the connection type, such a multimedia connection, a data connection, a speech connection. The connection type and the quality of service level affect e.g. the number of time slots TS1–TSn to be allocated for the connection.

The access point controller APC1 examines the message and finds out, e.g. from a resource allocation table or the like, how much resources are available at the access point AP1 at the time. If there are sufficient resources to set up a connection corresponding to the requested quality of service, the access point controller APC1 allocates the resources necessary for the connection. For the connection, transmission and connection sequences (buffers) are set up in the memory means 14 of the access point controller APC1, to be used for temporary storage of received packets and for temporary storage of packets waiting to be transmitted. Furthermore, each connection is allocated a connection identifier, whereby the transmission of the information to the correct target is secured. Also a priority level can be selected for the connection, wherein resources available each time, such as transmission and reception time slots, are allocated in the order of priority. Depending on e.g. the need for resources, it is possible to allocate different numbers of time slots TS1–TSn in the data field of the data frame FR for different connections. Also, the number of time slots allocated for transmission and for reception can vary even in the same connection, as already mentioned above in this description. Further, the number of time slots TS1–TSn can vary according to the frame, wherein the number of time slots TS1–TSn allocated for the connection in each data frame FR may vary from zero to a maximum. The location of the transmission and reception time slots contained in the data frame is preferably transmitted in the FCCH control field.

Figure 5:
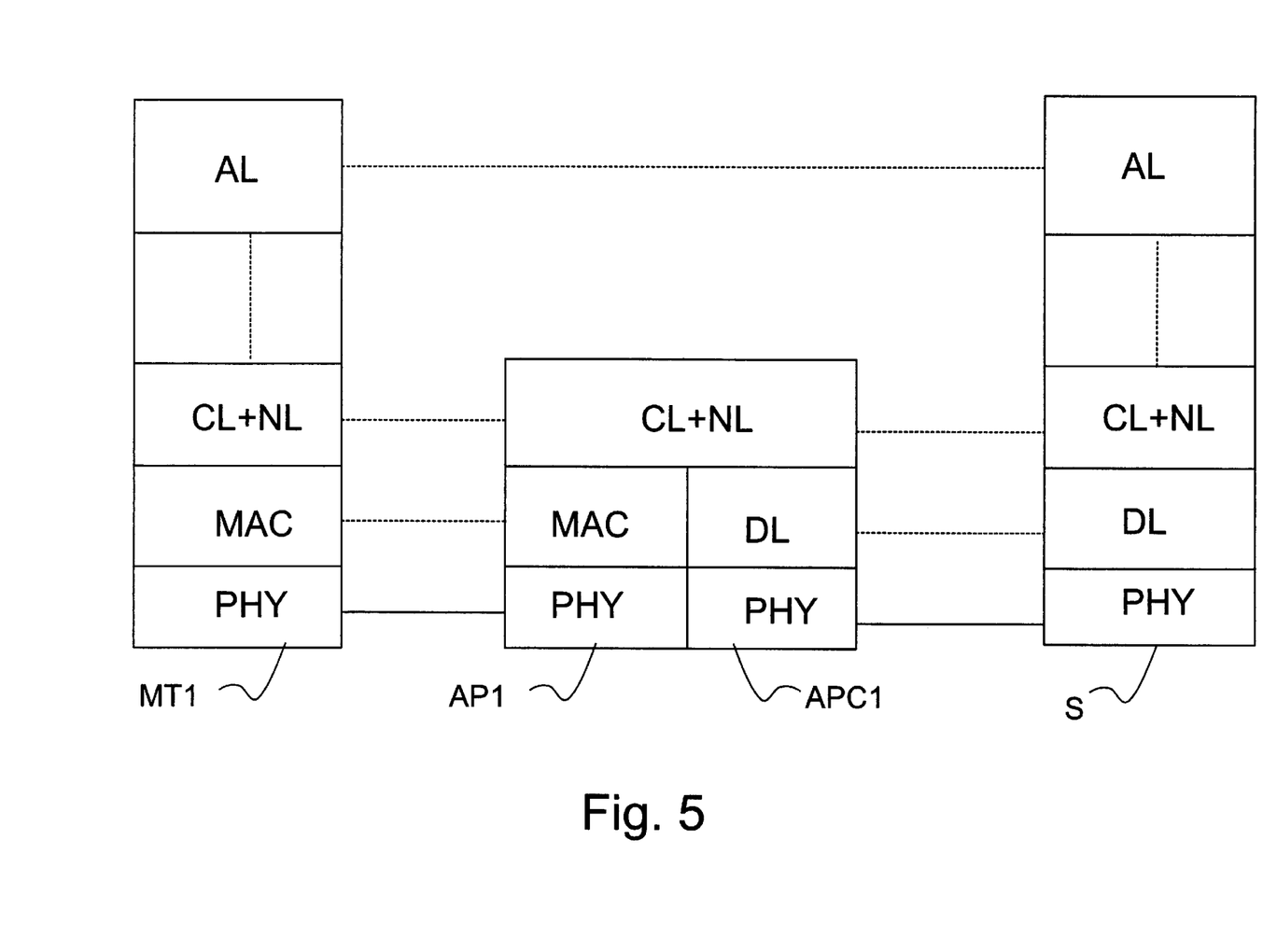
FIG. 5 shows protocol stacks to be applied in a communication system according to an advantageous embodiment of the invention in a reduced view.

After a connection has been set up to the local area network 1, it is possible to start data transmission between the server S and the wireless terminal MT1 preferably with a protocol, such as the IP (Internet Protocol). FIG. 5 illustrates this data transmission by means of protocol stacks. Of the protocol stacks, the application layer AL, the convergence layer and network layer CL+NL, the data link layer DL, and the physical layer PHY are presented. On the radio channel, i.e. between the access point AP1 and the wireless terminal MT1, the data link layer of the protocol stack comprises in this preferred embodiment the MAC layer (Media Access Control) as the lowermost layer which takes care of using the radio channel in communication between the wireless terminal MT1 and the access point AP1, such as channel allocation in the transmission and reception of packets. This description primarily deals with data frames FR of the MAC layer.

A scheduler 18 formed in the access point controller APC1, APC2 takes care of e.g. timing of the data frames FR of the access point AP1, AP2 and allocating transmission and reception time slots for packets of active connections, waiting to be transmitted. The scheduler switches the receiver of the access point to receive a radio signal for the time allocated for the RACH field of the frame. Thus, wireless terminals MT1–MT4 can, in addition to transmitting the above-presented connection set-up request, also transmit various measurement data to the access point.

To secure efficient use of the frequency range, radio resource control (RRC) systems have been developed for radio local area networks. In the HIPERLAN/2 system, the radio resource control system involves a dynamic frequency selection (DFS) process. In a situation in which there is no wireless terminal MT1 registered in the radio local area network, the access point AP1 selects the frequency on the basis of its own measurements. On the basis of these measurements, the access point AP1 can detect if there are other radio transmissions and/or interference at the same frequency range, and select the channel frequency. During normal operation of the local area network, the interference situation may be changed, and the access point AP1 may need to change the channel frequency. However, each wireless terminal MT1–MT4 has a different interference situation, wherein it may occur that all the wireless terminals cannot communicate sufficiently well with any access point. Thus, the selection of the channel frequency is preferably based on measurements conducted by both the access point and the wireless terminal MT1–MT4. The wireless terminal can conduct measurements by its own initiative and/or started by the access point.

There are three different measuring methods in the HIPERLAN/2 system: short, percentiles, and complete. In short measurement (type=67), the measuring is performed in such a way that the wireless terminal receives radio signals to detect a possible MAC frame and to be synchronized with the preamble of the BCCH field of the MAC frame. This reception, before the synchronization has been successful, can take considerably longer than the time taken in the reception of the MAC frame. After the wireless terminal has been synchronized, it receives the header C (BCCH field and FCCH field) of the received MAC frame and simultaneously measures the signal strength. Furthermore, the wireless terminal decodes the information contained in the header C. In percentiles measurement (type=66), the measuring is performed in such a way that at intervals, the wireless terminal measures the signal strength of the signals received by it and stores the value for each measurement. This measurements are compiled into a report which describes the percentual share of different signal strengths. In complete measurement (type=65), the measurements according to both the above-presented measurement types are performed. Said measurements can also be directed at desired frequencies. The access point can ask the wireless terminal to measure the channel frequency to be used in the connection in question, or another channel frequency available in the system.

Figure 4A:
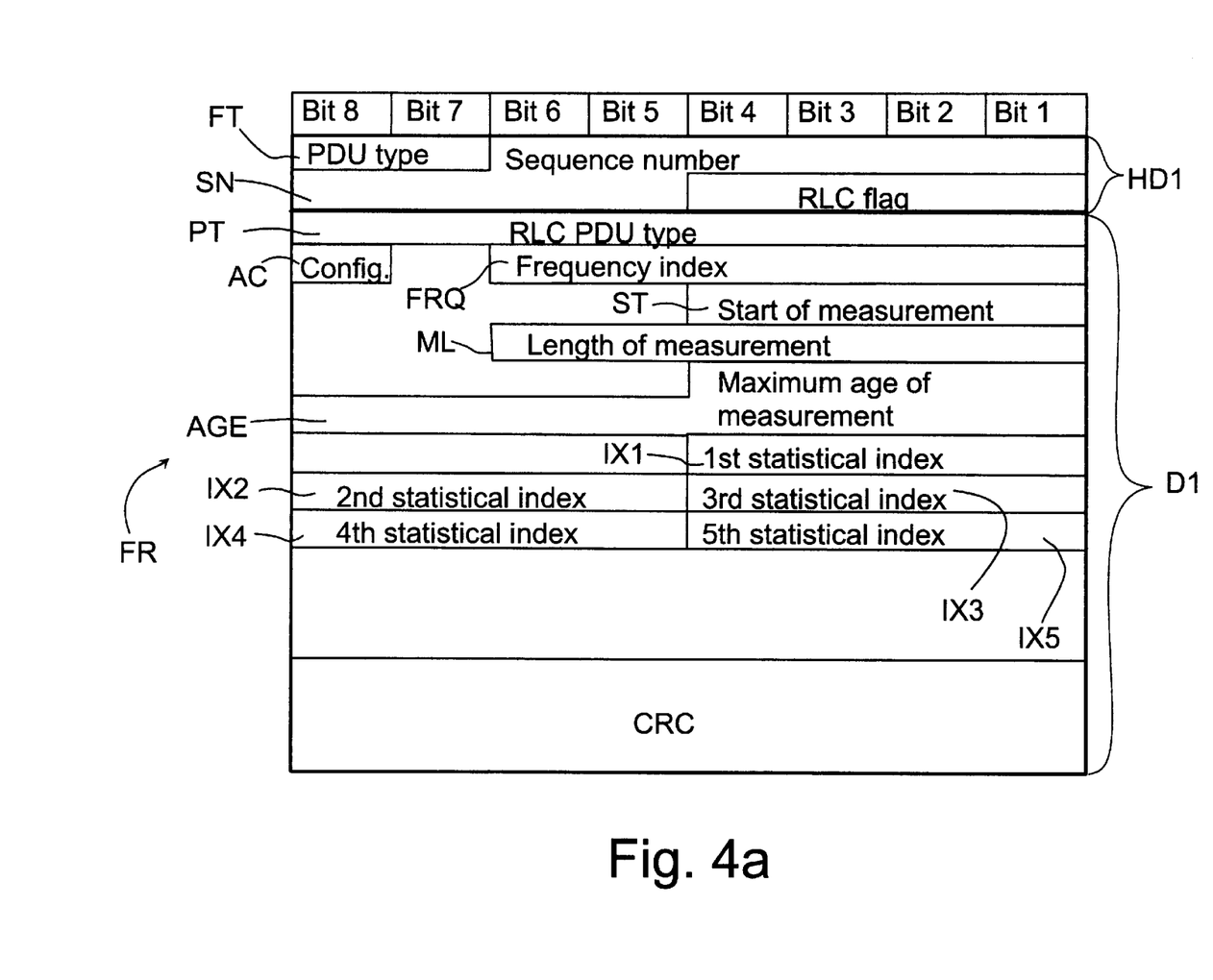
FIGS. 4a–4d show examples of some data frames.
Figure 4B:
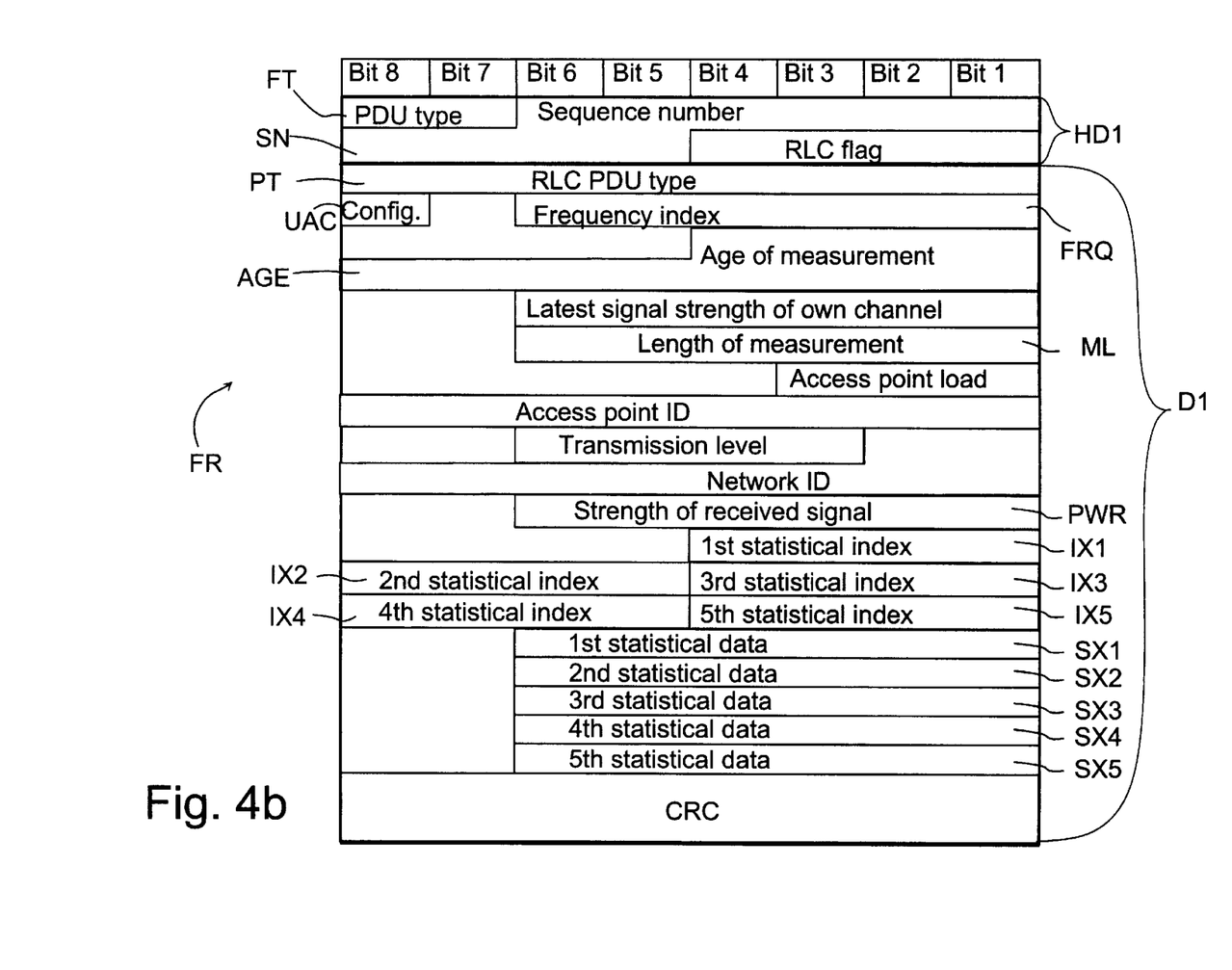

The following is a description of the operation of the method according to an advantageous embodiment of the invention in a communication system 1 of FIG. 1a, using a wireless terminal MT1 as an example and referring to the charts of the figures as well as to the data frames shown in FIGS. 4a and 4b.

For performing the measurements, the access point AP1 transmits a measurement request message to the wireless terminal MT1 in a data frame FR of the MAC layer. An advantageous example of this frame FR is shown in the appended FIG. 4a. At the beginning of the frame, there is a header HD1 which contains e.g. data on the frame type FR as well as a sequence number SN. The header HD1 is followed by a data field D1 which preferably contains data about the message type PT, data about the frequency FRQ to be measured, the time ST of starting of the measurement, the measurement length ML, the maximum age AGE of the measurement, as well as data for statistics IX1–IX5. In the system according to the present invention, the data field of the data frame FR also contains data about the type of the antenna configuration whereby the measurement should be taken. This data is indicated with the reference AC in the appended figures. It is obvious that the frame structures used in the specification are only some advantageous examples, but the invention can also be applied in connection with other types of frames.

The access point AP1 selects the type of the antenna configuration, whereby the measurement should be performed. In this preferred example, there are two configurations available: an omnidirectional configuration and a configuration used in reception. In the measurement request message, the access point AP1 sets the antenna configuration data AC, e.g. the binary value 0, if the wireless terminal MT1 should set the directional pattern of the antenna to be omnidirectional, and the binary value 1, if the wireless terminal MT1 should use the directional pattern of the antenna valid at the time.

In the measurement request message, the access point AP1 sets the type data PT to the value corresponding to the desired measurement type (=67, 66 or 65). Furthermore, the access point selects the frequency to be measured and supplements the message with data FRQ on the selected frequency. The frequency can be advantageously given as a channel number or another corresponding index. Thus, the channel number, e.g. 0–127, indicates the absolute frequency. On the other hand, the frequency can also be given in relation to the frequency used by the access point and wireless terminal in question at the time. In this alternative, the frequency data FRQ is set as 0, if the access point AP1 wants the wireless terminal MT1 to measure the frequency to be used in this connection. If the access point AP1 has selected the frequency to be selected to be the next upper channel frequency, the frequency data is thus set as 1. In a corresponding manner, if the access point AP1 has selected the frequency to be selected to be the next lower channel frequency, the frequency data is thus set as −1.

The time ST of starting the measurement controls the wireless terminal MT1 to start the measurement at the desired moment. After receiving the measurement request message, the wireless terminal starts the measurement at the moment given in the measurement request message. Thus, the wireless terminal MT1 tunes the local oscillator 12 in such a way that the desired channel frequency is received at the receiver 8.

The measurement length data ML determines the number of frames, during which the measurement is performed. In connection with the short measurement, however, data related to the signal strength of a maximum of one frame is reported, even though the measurement time were several frames.

The maximum age data AGE of the measurement indicates to the wireless terminal, how old data the measurement data is allowed to be. Thus, if the wireless terminal MT1 has already made a measurement whose age is not older than this time indicated in the maximum age data, the wireless terminal MT1 can transmit the data of this measurement to the access point AP1. Thus, no new measurement is needed in this connection.

In the percentile and complete measurement, the access point AP1 indicates to the wireless terminal AP1, which statistical data must be calculated and reported to the access point AP1.

After receiving and processing the measurement request message, the wireless terminal MT1 starts the measurement when the starting condition defined in the message is met. At the beginning of the measurement, it is examined, what type of an antenna configuration should be used for the measurement. If the control means 11 deduces that the measurement can be performed with the requested configuration, the antenna configuration is set as desired. If for any reason, e.g. the antenna is not an intelligent antenna, the requested antenna configuration cannot be used for the measurement, the antenna configuration is not changed. If the wireless terminal MT1 has used a directional antenna configuration and the measurement request message has contained an omnidirectional antenna as the antenna configuration AC, the control means 11 (FIG. 2) sets, in the bus 28 for controlling the antenna control means 27, a control signal for changing the directional pattern of the antenna to be substantially omnidirectional. In other cases, the directional pattern of the antenna does not need to be changed for the measurement. After this, the measuring means 29 of the wireless terminal MT1 starts the signal strength measurement. If the wireless terminal MT1 receives a signal of a device complying with the HIPERLAN/2 system, the wireless terminal MT1 tries to synchronize itself with the preamble of the BCCH field of the MAC frame of this signal. After the synchronization, the signal strength is measured preferably as an average value for the time of the preamble, and is stored in the memory means 13. Also, information of the header C is decoded and stored. In case of short measurement, the next step is to generate a reply message. However, in the case of percentile or complete measurement, the next step is preferably to set a time control in the control means 11, whereby the measurements are repeated for a predetermined time, e.g. at intervals of 8 μs. Each measurement result is stored. The above-presented steps are repeated, until the determined measurement time has expired. After that, statistical calculations are performed, e.g. the calculation of the average or the percentual calculation of the measurements, and the next step is to generate the reply message. On the other hand, the average calculation can be performed after each measuring time, wherein single measurement results do not need to be stored as such.

If, at the measuring stage, the wireless terminal MT1 does not detect a MAC frame during the measurement time, the signal does not need to be decoded either. Thus there is probably another interference source in question. The strength of this signal is, however, indicated in the measurement report.

A memory space (message buffer, not shown) is preferably reserved for messages in the memory means 13. The appended FIG. 4b shows an advantageous structure of a reply message. This is a message structure intended for the transmission of data from the complete measurement. For the short measurement and for the percentile measurement, it is possible to use the same structure, but some of the fields are thus left incomplete. To generate a reply message, the control means 11 of the wireless terminal sets in this message buffer the header data of the MAC frame, such as the frame type and sequence number. In the space reserved for the data field of the MAC frame, the control means 11 composes the data of the reply message. This data contains e.g. the message type, the signal strength measured from the preamble of the BCCH field belonging to the respective connection, as well as other measurement results, whose content is affected by the type of measurement in question.

In the reply message, a data field is reserved for the configuration data, which in the appended FIG. 4b is indicated with the reference UAC. In other respects, the same references are used for the corresponding fields of the request message and the reply message in connection with FIG. 4b as in FIG. 4a. In this preferred embodiment, the size of the configuration data field UAC is 1 bit. Thus, the bit value is set e.g. to the binary digit 0, if the omnidirectional antenna configuration was used in the measurement, or the binary digit 1, if the omnidirectional antenna configuration was not used in the measurement. The other data of the reply message, such as the statistical data SX1–SX5 are set according to prior art. Further, on the basis of the content of the reply message, a checksum CRC is calculated, on the basis of this the receiver of the message can find out if the message was received correctly.

After the data for the reply message have been generated, it is possible to start the measures for transmitting the reply message. Thus, the control means 11 uses the data transmitted in the control field C to find out when a transmission time slot is allocated for the wireless terminal MT1 in question. During said transmission time slot, the control means 11 transfers the reply message from the message buffer to the communication means COM, where modulation and encoding are performed in a way known as such. At this stage, the control means 11 changes the directional pattern of the antenna, if necessary.

To change the directional pattern of the antenna, for example the phasing of the filters is changed in the antenna control means 27 in such a way that the desired directional pattern is achieved.

The access point AP1 receives the transmitted reply message and stores the data in a receiving buffer (not shown). The controller 19 of the access point controller analyzes the measurement data of the reply message, such as the percentual signal strengths. The analysis takes into account the antenna configuration with which the measurements were taken. If an omnidirectional antenna was used in the measurement, the measurement results reflect an interference situation in the vicinity of the wireless terminal MT1 better than if a directional antenna were used. This may be due e.g. to the fact that a source of interference is located in such a direction which is offset from the main beam of the directional antenna. If the source of interference or the wireless terminal MT1 move, a situation may occur in which the source of interference is in the direction of the main beam of the antenna, wherein the interference effect may be significantly greater. Such a situation could be anticipated by taking the interference measurement with an omnidirectional antenna.

The access point AP1 can scan the interference situation by requesting the wireless terminals belonging to the system to take the above-presented measurements at the channel frequency used in the connection and e.g. the adjacent channel frequencies. On the basis of these measurements, the access point AP1 can change the channel frequency, if necessary. The selection of the channel frequency is thus affected by e.g. the interference level at the different channel frequencies.

In the interference measurements, the access point AP1 takes into account that during the time when a wireless terminal MT1–MT4 is taking measurements, no data frames are transmitted to it. If the purpose of the measurements is to find out a general interference level caused by other systems or sources of interference, the access point AP1 controls the timing of the measurement preferably so that no data transmission takes place between the access point AP1 and the wireless terminals MT1–MT4 under the control of the access point in question.

The wireless terminal MT1 which conducted measurements also decoded, e.g. in the case of short measurement, from the header C of the measured frame the information transmitted in the control field C. From this information, the wireless terminal MT1 preferably transmitted to the access point AP1 information, on the basis of which the access point AP1 is capable of deducing whether the measured signal is a radio signal of a device belonging to the same system, a radio signal of another system, or a spurious signal caused by another device. On the basis of this, the access point can draw conclusions on whether it is possible improve the quality of the connection, if possible, e.g. by changing the channel frequency, raising its own transmission level, or using an encoding and/or modulation which is more resistant to interference.

Figure 4C:
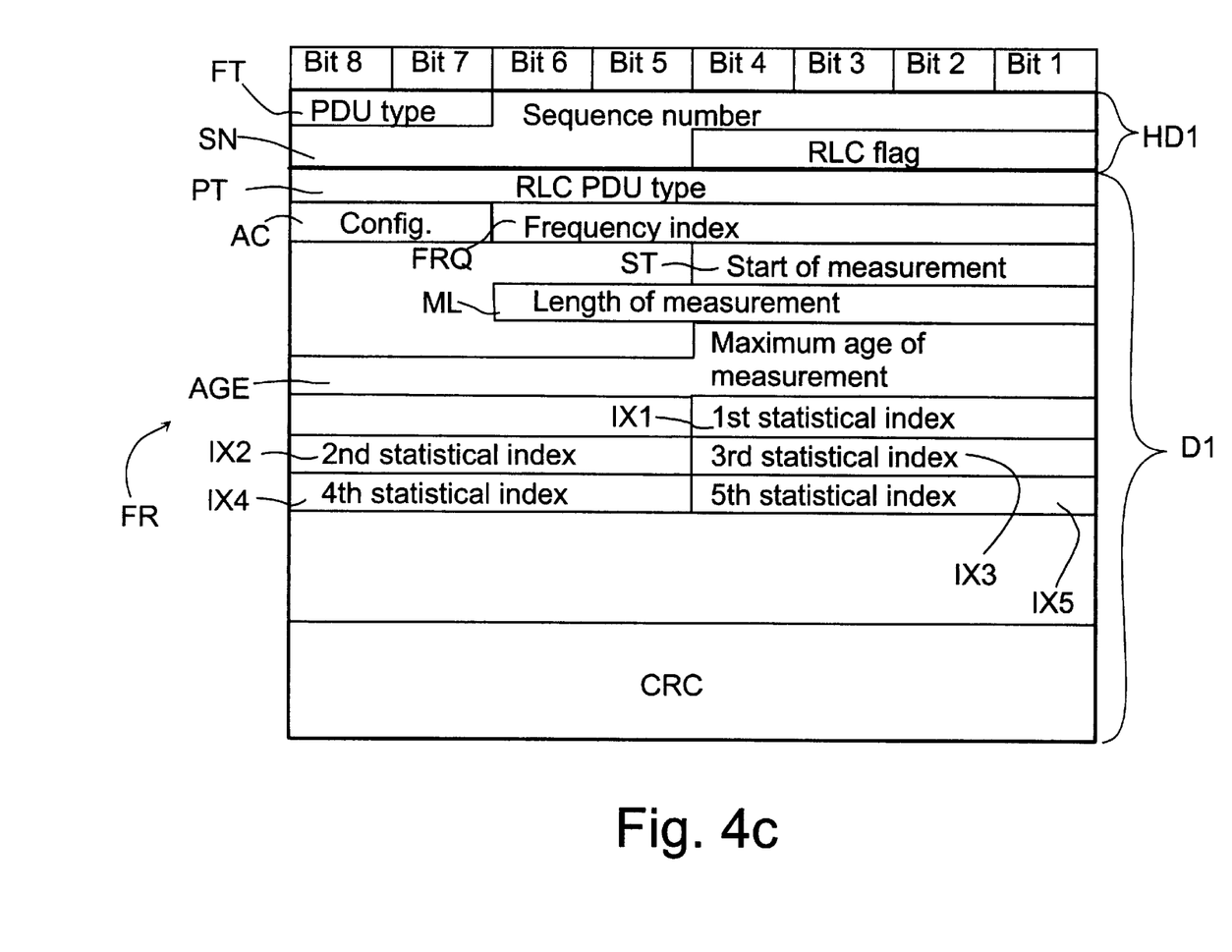

In a method according to another advantageous embodiment of the invention, the antenna configuration can also be changed during the measurement. Thus, the first configuration is preferably used for the measurement of the signal strength of its own signal strength, and the second antenna configuration is used for the measurement of the strengths of other signals. In this way, the antenna 30 of the wireless terminal MT1 can be set as a directional antenna for measuring the strength of the signal received from the access point AP1, to which the wireless terminal MT1 is coupled at the time (so-called serving access point). In a corresponding manner, for measuring the general interference level, the antenna 30 of the wireless terminal can be set as an omnidirectional antenna. Thus, e.g. the measurement request message according to the appended FIG. 4c gives the configuration with which the strength of the own access point AP1 is measured and, accordingly, the antenna configuration to be used in other measurements. To transmit this data, at least two bits are needed.

Figure 4D:
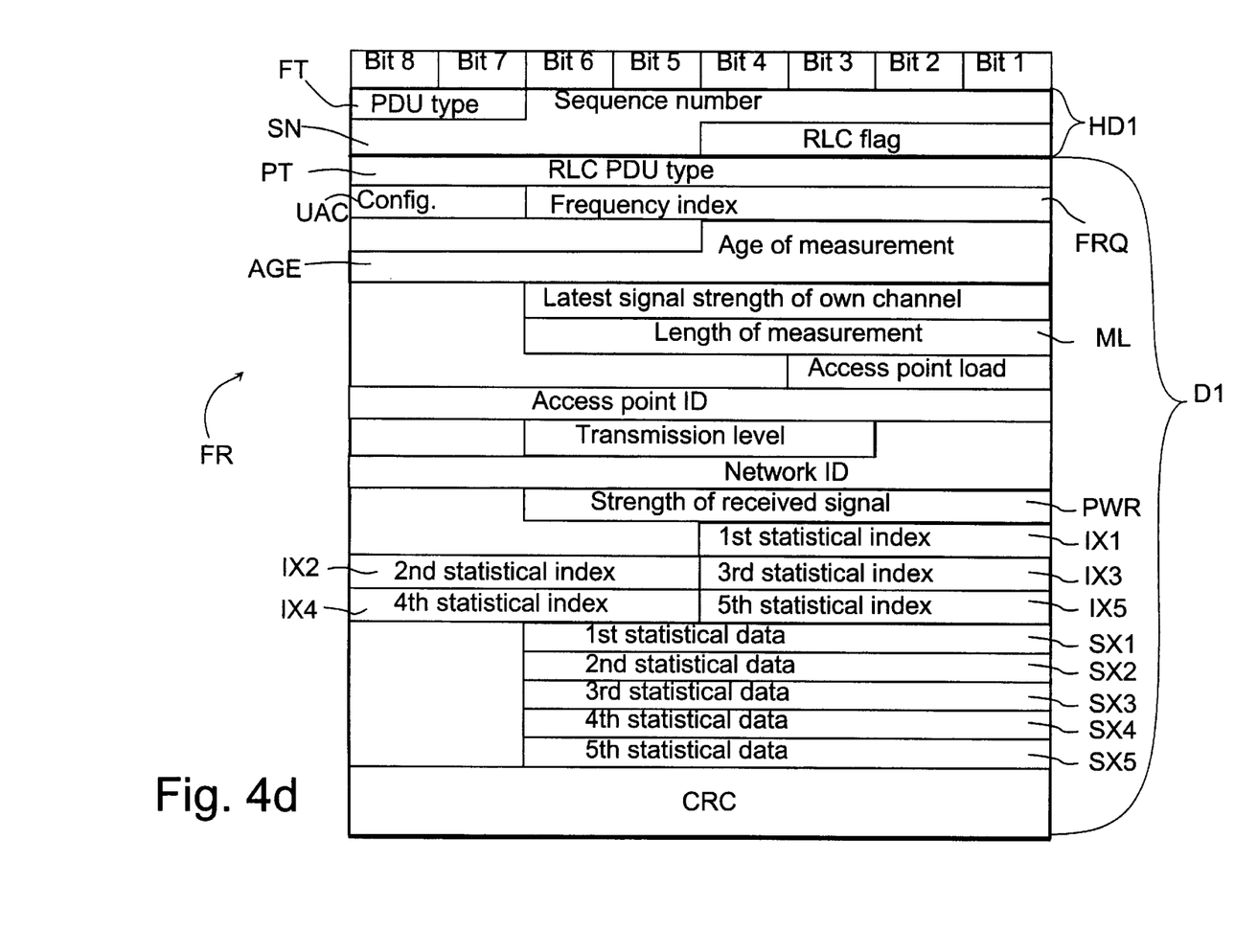

In this second advantageous embodiment, the wireless terminal MT1 gives, e.g. in the measurement message according to the appended FIG. 4d, the antenna configuration used in the measurement of the strength of the signal of the own access point AP1 and the antenna configuration used in the measurement of the strengths of other signals.

By using a directional antenna 30, it is also possible to try to direct the antenna in a desired direction, e.g. towards the source of interference. Thus, the signal strength of the source of interference in question can be measured more accurately than with an omnidirectional antenna, because the effect of other sources of interference in the measurement results can be reduced. This direction can be made e.g. by measuring the signal strength and changing the directional pattern by setting the signal causing this in the bus 28. Thus, the antenna control means 27 changes the directional pattern of the antenna. By measuring the signal strength, it can be found out if the signal strength was changed. On the basis of this measurement, the control means 11 can deduce whether the main beam of the antenna moves towards or away from the source of interference. By repeating the above-presented steps until the maximum signal strength is achieved, the correct direction can be found out at a sufficient accuracy.

In the wireless terminal MT1, the operations of the method according to the invention can be preferably implemented in the application software of the control means 11 of the communication means, but also e.g. the processor 2 can be used. At the access point AP1, the examination of the acknowledgement message and possible measures for changing the connection can be preferably implemented in the access point controller APC1.

The invention can also be applied in systems other than the HIPERLAN/2 used in this example. For example in the mobile communication system according to the GSM system (not shown), a base transceiver station corresponds to the access point AP1, AP2, and a base station controller corresponds to the access point controller APC1, APC2, being in radio communication with wireless communication devices via base transceiver stations. The control messages to be used in connection with the measurement operations must thus be supplemented with a data field for selecting the antenna configuration, and the reply messages must be supplemented with a data field for reporting the antenna configuration used in the real measurement to the base station controller. The antenna configurations can be advantageously reported in an SACCH message. These measurement data are used e.g. in a handover situation to select a new base station.

In a corresponding manner, in the WCDMA system (not shown), a base transceiver station (Node-B) corresponds to the access point AP1, AP2, and a radio network controller corresponds to the access point controller APC1, APC2.

Also other than time division multiple access systems are feasible, for example a code division multiple access (CDMA) system or a frequency division multiple access (FDMA) system, or a combination of these different systems. Thus, in the code division multiple access system, the feature corresponding to time slots (transmission slot) is a code sequence, and in the frequency division multiple access system, it is a frequency span.

It is obvious that the present invention is not limited solely to the embodiments presented above, but it can be modified within the scope of the appended claims.

What is claimed is:

1. A method in a wireless communication system (1) which comprises wireless terminals (MT1–MT4) and at least one access point (AP1, AP2) and access point controller (APC1, APC2), in which method:

at least one antenna configuration is determined for an antenna (30) of the wireless terminal (MT1–MT4), the antenna (30) of the wireless terminal (MT1–MT4) is used for receiving a radio signal, the strength of the radio signal received by the antenna (30) of the wireless terminal (MT1–MT4) is measured, a measurement message (HD1, D1) is formed of one or more measurements, and said measurement message (HD1, D1) is transmitted from the wireless terminal (MT1–MT4) to the access point (AP1, AP2), characterized in that in the method, data (UAC) about the antenna configuration during the measurement is also added into said measurement message (HD1, D1).

2. The method according to claim 1, characterized in that for performing the measurement, a measurement request message is transmitted from the access point (AP1, AP2) to the wireless terminal (MT1–MT4).

3. The method according to claim 1, characterized in that the antenna configuration comprises data about the radiation pattern of the antenna.

4. The method according to claim 1, characterized in that in the method, at least two antenna configurations are determined for changing the properties of the antenna (30) of the wireless terminal, one of the determined antenna configurations is selected at the access point (AP1, AP2), and data (AC) about the selected antenna configuration is transmitted in said measurement request message to the wireless terminal (MT1–MT4).

5. The method according to claim 4, characterized in that the first antenna configuration comprises a substantially omnidirectional radiation pattern, and that the second antenna configuration comprises a directional radiation pattern, wherein the antenna is changed, for the time of the measurement, into a substantially either omnidirectional or directional antenna.

6. The method according to claim 5, characterized in that in the method, the direction of the transmitter of the radio signal in relation to the wireless terminal (MT1–MT4) is determined, that for the time of the measurement, the antenna (30) is set to be directional, and that the antenna is directed towards the determined sender of the radio signal.

7. The method according to claim 1, characterized in that the measurement is taken in at least two steps, wherein for each measurement step, an antenna configuration is selected for use in the measurement step.

8. The method according to claim 7, characterized in that in one measurement step, the directional antenna is set as the antenna configuration and the strength of the radio signal of the access point (AP1, AP2) is measured, and that in another measurement step, to find out the interference level, the omnidirectional antenna is set as the antenna configuration and the strength of the radio signal is measured.

9. The method according to claim 7, characterized in that in one measurement step, the directional antenna is set as the antenna configuration and the strength of the radio signal of the access point (AP1, AP2) is measured, and that in another measurement step, to find out the strength of a spurious signal, the directional antenna is selected as the antenna configuration, the direction of the sender of the spurious radio signal in relation to the wireless station (MT1–MT4) is determined, the antenna (30) is directed at the determined sender of the spurious signal, and the strength of the radio signal is measured.

10. The method according to claim 1, wherein signal strength data transmitted in the measurement message are used to determine the interference level of the wireless terminal, characterized in that in the determination of the interference level, the antenna properties used in the measurement are taken into account in addition to the signal strength data.

11. A wireless communication system (1) which comprises wireless terminals (MT1–MT4) comprising at least one antenna (3) for receiving radio signals, at least one antenna configuration being determined for the antenna (30), at least one access point (AP1, AP2) and access point controller (APC1, APC2), means (29) for measuring the strength of a radio signal received with the antenna (30) of the wireless terminal (MT1–MT4), means (11) for forming a measurement message (HD1, D1) of one or more measurements, and means (COM) for transmitting said measurement message (HD1, D1) from the wireless terminal (MT1–MT4) to the access point (AP1, AP2), characterized in that the wireless communication system (1) also comprises means (11) for adding data (UAC) indicating at least one antenna configuration used during the measurement into said measurement message (HD1, D1).

12. The wireless communication system (1) according to claim 11, characterized in that it also comprises means (15) for transmitting a measurement request message to the wireless terminal (MT1–MT4) for performing a measurement.

13. The wireless communication system (1) according to claim 11, characterized in that the antenna configuration comprises data about the radiation pattern of the antenna.

14. The wireless communication system (1) according to claim 11, characterized in that at least two antenna configurations are determined to change the properties of the antenna (30) of the wireless terminal, wherein the wireless communication system (1) also comprises means (AP1, AP2, APC1, APC2) for selecting an antenna configuration, and means (15) for transmitting data (AC) about the selected antenna configuration in said measurement request message to the wireless terminal (MT1–MT4).

15. The wireless communication system (1) according to claim 14, characterized in that the first antenna configuration comprises a substantially omnidirectional radiation pattern, and that the second antenna configuration comprises a directional radiation pattern, wherein the antenna (30) is arranged to be changed, for the time of the measurement, to be either a substantially omnidirectional antenna or a substantially directional antenna.

16. The wireless communication system (1) according to claim 11, characterized in that it comprises means (11, 27,28) for determining the direction of the transmitter of a radio signal in relation to the wireless terminal (MT1–MT4), that for the time of the measurement, the antenna (30) is set to be directional, and that the antenna is directed towards the determined sender of the radio signal.

17. The wireless communication system (1) according to claim 11, characterized in that the measurement is arranged to be performed in at least two steps, wherein the wireless communication system (1) comprises means for selecting for each measurement step an antenna configuration to be used in the measurement step.

18. The wireless communication system according to claim 11, which comprises means (APC1, APC2) for determining the interference level of the wireless terminal (MT1–MT4) on the basis of the signal strength data transmitted in the measurement message, characterized in that in addition to the signal strength data, the properties of the antenna (30) used in the measurement are arranged to be taken into account in the determination of the interference level.

19. The wireless communication system (1) according to claim 11, characterized in that it is a communication system complying with the HIPERLAN/2 standard.

20. The wireless communication system (1) according to claim 11, characterized in that it is a communication system complying with the GSM standard.

21. A wireless terminal (MT1–MT4) comprising:

at least one antenna (30) for receiving radio signals, at least one antenna configuration being determined for the antenna (30), means (29) for measuring the strength of a radio signal received with the antenna (30) of the wireless terminal (MT1–MT4), means (11) for forming a measurement message (HD1, D1) of one or several measurements, and means (COM) for transmitting said measurement message (HD1, D1), characterized in that the wireless terminal (MT1–MT4) also comprises means (11) for adding data (UAC) indicating at least one antenna configuration used during a measurement into said measurement message (HD1, D1).

22. An access point (AP1, AP2) comprising means (COM) for receiving a measurement message (HD1, D1) formed in the wireless terminal (MT1–MT4), characterized in that the access point (AP1, AP2) also comprises means (11) for determining the data (UAC) indicating at least one antenna configuration used during a measurement from said measurement message (HD1, D1).

* * * * *